United States Patent
Yamamoto

(10) Patent No.: US 6,637,281 B2
(45) Date of Patent: Oct. 28, 2003

(54) SHIFT-ASSISTING DEVICE FOR A TRANSMISSION

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/739,232

(22) Filed: Dec. 19, 2000

(65) Prior Publication Data
US 2001/0015109 A1 Aug. 23, 2001

(30) Foreign Application Priority Data
Feb. 23, 2000 (JP) .................... 2000-046173

(51) Int. Cl.$^7$ .................... F16H 63/00; B60K 17/04
(52) U.S. Cl. ............... 74/335; 74/388 R; 74/473.12
(58) Field of Search ................... 74/335, 388 R, 74/473.12; 192/3.62

(56) References Cited

U.S. PATENT DOCUMENTS

| | | | | |
|---|---|---|---|---|
| 1,313,362 A | * | 8/1919 | Wiegand | 74/473.12 |
| 3,049,934 A | * | 8/1962 | Butler et al. | 74/335 |
| 4,570,765 A | * | 2/1986 | Makita | 74/335 X |
| 4,745,822 A | * | 5/1988 | Trachman et al. | 74/335 |
| 4,911,031 A | * | 3/1990 | Yoshimura et al. | 74/335 |
| 5,119,913 A | * | 6/1992 | Focqueur et al. | 74/388 R X |
| 5,370,015 A | * | 12/1994 | Moscatelli | 74/335 |
| 5,433,125 A | * | 7/1995 | Muller | 74/335 X |
| 5,460,060 A | * | 10/1995 | Nellums | 74/473.12 |
| 6,016,717 A | * | 1/2000 | Wheeler | 74/473.12 |

FOREIGN PATENT DOCUMENTS

| | | |
|---|---|---|
| EP | 0 245 216 | 11/1987 |
| EP | 0 310 387 | 4/1989 |
| EP | 0 373 273 | 6/1990 |
| EP | 0 976 955 | 2/2000 |
| FR | 2 760 546 | 9/1998 |
| FR | 2 773 751 | 7/1999 |

* cited by examiner

Primary Examiner—Charles A Marmor
Assistant Examiner—Ha Ho
(74) Attorney, Agent, or Firm—Antonelli, Terry, Stout & Kraus, LLP

(57) ABSTRACT

A shift-assisting device for a transmission. An electric motor operates a shifting mechanism in the same direction as the direction in which a speed-change lever is shifted. The shifting mechanism is coupled to the speed-change lever to actuate a synchronizing mechanism of the transmission. The shift-assisting device for a transmission includes a shift stroke sensor for detecting a shift stroke position of said shifting mechanism and a controller for outputting a control signal corresponding to the shift stroke position to the electric motor based on a signal detected by the shift stroke sensor.

5 Claims, 5 Drawing Sheets

SHIFT-ASSISTING DEVICE FOR A TRANSMISSION

FIELD OF THE INVENTION

The present invention relates to a shift-assisting device which enables the gear shifting operation to be executed with a decreased force in changing the speed of a transmission mounted on a vehicle.

DESCRIPTION OF THE PRIOR ART

Large trucks and buses that require a large shifting force for changing the speed have been equipped with a shift-assisting device for executing the shifting operation with a decreased force. The shift-assisting device with which large vehicles are furnished, generally, uses compressed air as a source of operation. The shift-assisting device that uses compressed air as the source of operation, comprises a shift actuator equipped with a pneumatic pressure cylinder that operates the speed-change operation mechanism coupled to a speed-change lever in the same direction as the direction in which the speed-change lever is shifted. Large vehicles generally use compressed air as a source for operating the brake and are, hence, able to use the compressed air for the shift-assisting device. However, small- and medium-size vehicles that are not equipped with a compressor as a source of compressed air, cannot be provided with a shift-assisting device that uses a shift actuator which comprises a pneumatic pressure cylinder. In recent years, however, it has been demanded that even small- and medium-size vehicles be provided with a shift-assisting device, and there have been proposed shift-assisting devices using an electric motor, as disclosed in, for example, Japanese Laid-open Patent Publication (Kokai) No. 87237/1993 and Japanese Patent No. 2987121.

In order to smoothly execute the shifting operation in a shift-assisting device that employs an electric motor, it is desired that the driving force of the electric motor be controlled in response to the operation of the speed-change lever by a driver. According to the shift-assisting devices disclosed in the above Japanese Laid-open Patent Publication (Kokai) No. 87237/1993 and Japanese Patent No. 2987121, a force for operating the speed-change lever is detected, and the driving force of the electric motor is controlled depending on the force of operation. That is, in shifting the transmission equipped with a synchronizing mechanism, the largest operation force is required at the time of accomplishing the synchronizing action in the gear-engaging operation, and next, a fairly large operation force is required for bringing the chamfer of dog teeth into engagement with the chamfer of a spline of a clutch sleeve. In the gear-disengaging operation, further, the operation force is required from the moment of starting the gear-disengaging operation until the dog teeth come out of mesh with the spline of the clutch sleeve. In the shift-assisting device which controls the driving force of the electric motor according to the operation force, however, the electric motor is driven after the operation force has reached a predetermined value, and hence there is a time lag until an assisting force is produced after an increase in the operation force. In executing the shifting operation, therefore, the driver feels a large force just before the electric motor is actuated to produce the assisting force.

SUMMARY OF THE INVENTION

It is therefore an object of the present invention to provide a shift-assisting device for a transmission which is capable of leveling the force required for operating the speed-change lever over the whole stroke of the shifting operation.

In order to solve the above-mentioned principal technical assignment according to the present invention, there is provided a shift-assisting device for a transmission having an electric motor for operating a shifting mechanism in the same direction as the direction in which a speed-change lever is shifted, said shifting mechanism being coupled to said speed-change lever to actuate a synchronizing mechanism of the transmission, wherein said shift-assisting device for a transmission comprises:

a shift stroke sensor for detecting a shift stroke position of said shifting mechanism; and a controller for outputting a control signal corresponding to the shift stroke position to said electric motor based on a signal detected by said shift stroke sensor.

The controller outputs a drive signal to the electric motor over at least a synchronizing range in the shift stroke range of the shifting mechanism at the gear-engaging operation in the shifting operation, and outputs a drive signal to the electric motor over at least a range in which a clutch sleeve of the synchronizing mechanism is in mesh with the dog teeth at the gear-disengaging operation in the shifting operation. Further, the controller sets a driving force of the electric motor in the range in which the clutch sleeve is in mesh with the dog teeth at the gear-disengaging operation to be smaller than a driving force of the electric motor in the synchronizing range at the gear-engaging operation.

The controller, at the gear-engaging operation, outputs a drive signal to the electric motor in at least the synchronizing range in the shift stroke range of the shifting mechanism and in the range in which the chamfer of the clutch sleeve of the synchronizing mechanism is in mesh with the chamfer of the dog teeth. Further, the controller sets a driving force of the electric motor in a range in which the chamfer of the clutch sleeve is in mesh with the chamfer of the dog teeth at the gear-engaging operation to be smaller than a driving force of the electric motor in the synchronizing range at the gear-engaging operation.

DETAILED DESCRIPTION OF THE PREFERRED EMBODIMENTS

A preferred embodiment of the shift-assisting device in a transmission constituted according to the invention will now be described in further detail with reference to the accompanying drawings.

Figure 1:
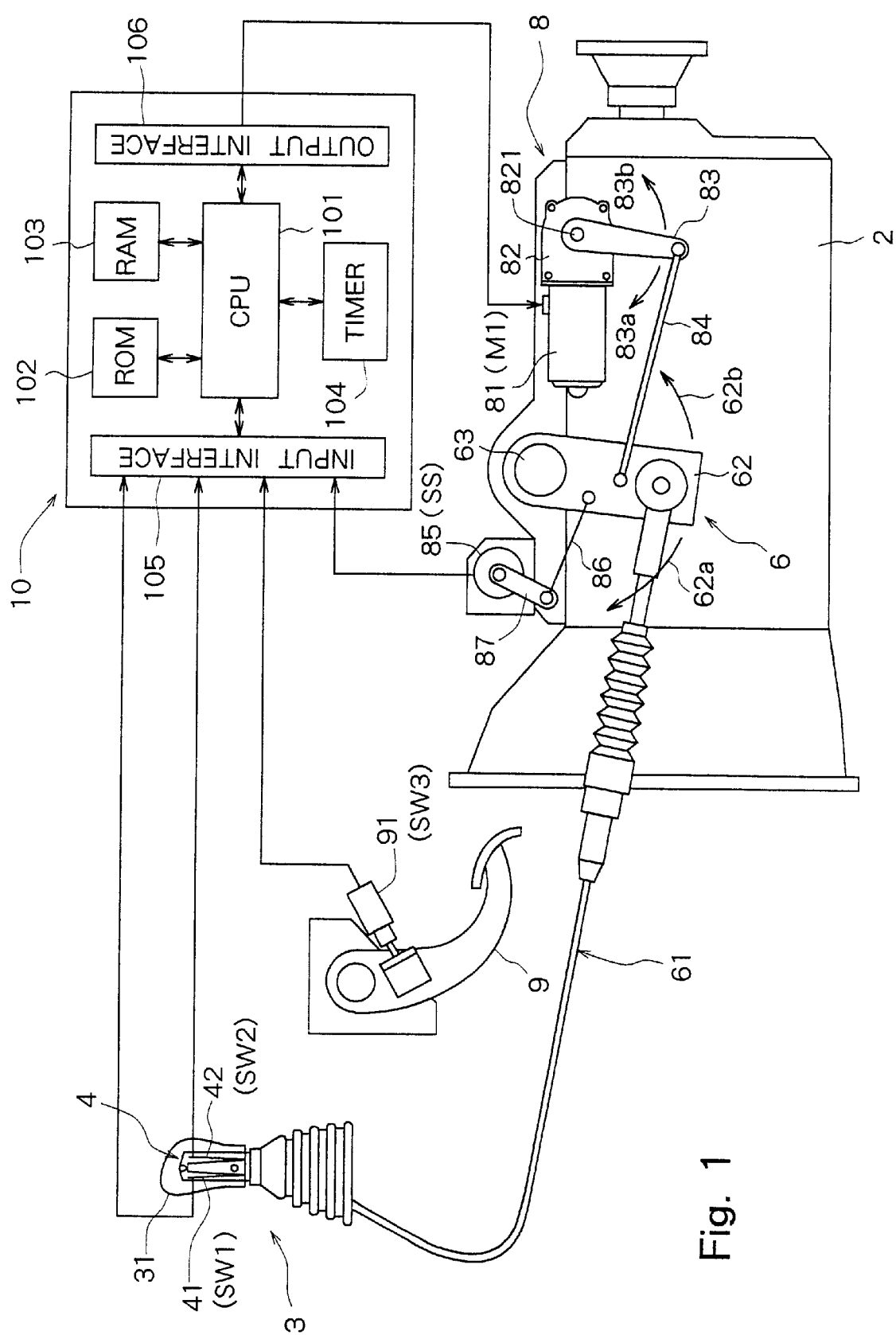
FIG. 1 is a diagram schematically illustrating the constitution of a speed-changing mechanism equipped with a shift-assisting device in a transmission constituted according to the present invention.

FIG. 1 is a diagram schematically illustrating the constitution of a speed-changing mechanism equipped with a shift-assisting device in a transmission constituted according to the present invention.

The speed-hanging mechanism shown in FIG. 1 comprises a speed-change lever 3 for changing the speed of a transmission 2 equipped with a synchronizing mechanism, a shifting mechanism 6 coupled to the speed-change lever 3, and a shift-assisting device 8 for operating the shifting mechanism 6 in the same direction as the direction in which the speed-change lever 3 is shifted.

Figure 2:
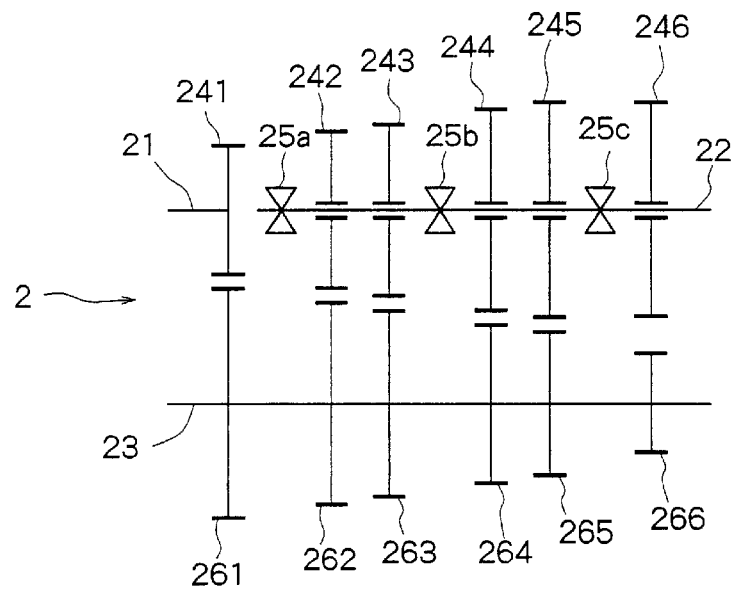
FIG. 2 is a diagram schematically illustrating the constitution of a gear mechanism in the transmission shown in FIG. 1.

Referring to FIG. 2, the transmission 2 comprises a gear mechanism of five forward speeds and one reverse speed. The transmission 2 has an input shaft 21, an output shaft 22 disposed on the same axis as that of the input shaft 21, and a counter shaft 23 arranged in parallel with the output shaft 22. On the input shaft 21 is mounted a drive gear 241 (a fifth speed gear in the illustrated embodiment), and on the output shaft 22 are rotatably mounted a fourth speed gear 242, a third speed gear 243, a second speed gear 244, a first speed gear 245 and a reverse gear 246. On the output shaft 22 are further disposed synchronizing mechanisms 25a, 25b and 25c respectively between the fifth speed gear 241 and the fourth speed gear 242, between the third speed gear 243 and the second speed gear 244 and between the first speed gear 245 and the reverse gear 246. On the counter shaft 23, there are arranged counter gears 261, 262, 263, 264 and 265 that are in mesh with the fifth speed gear 241, fourth speed gear 242, third speed gear 243, second speed gear 244 and first speed gear 245 at all times, as well as a counter gear 266 that is in mesh with the reverse gear 246 via an idling gear that is not shown.

Figure 3:
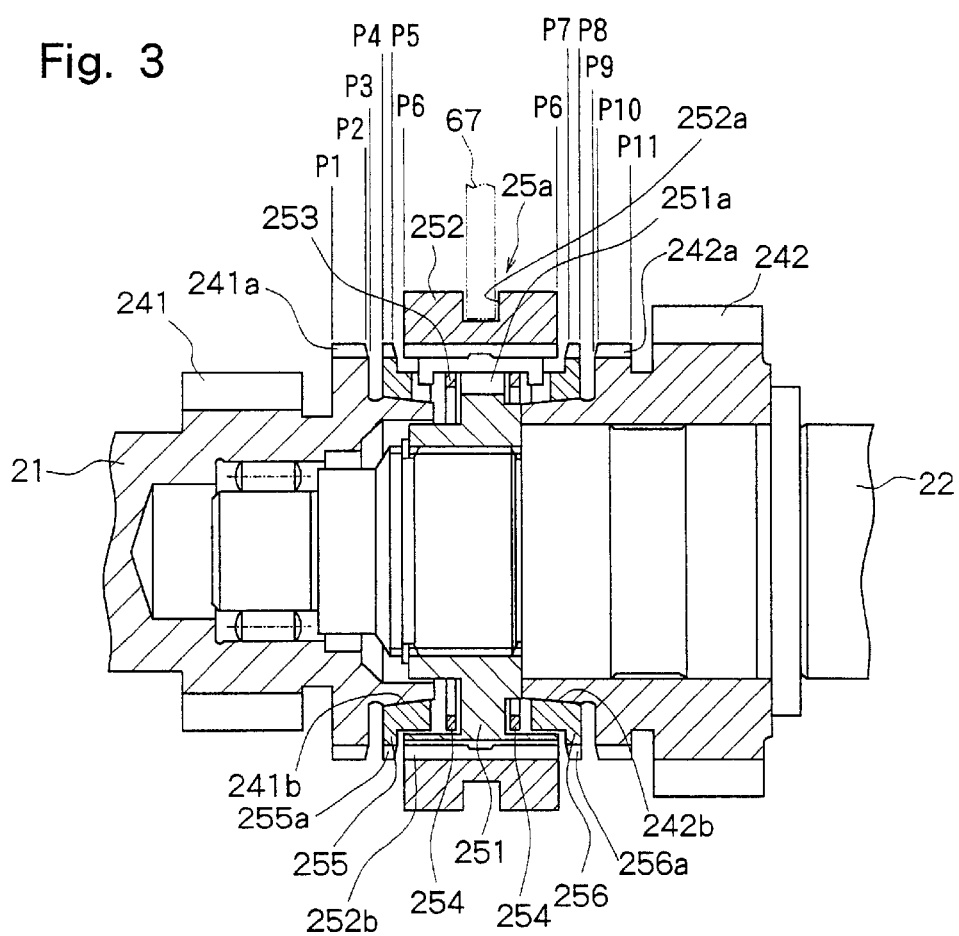
FIG. 3 is a sectional view of a synchronizing mechanism with which the transmission of FIG. 2 is furnished.

Next, the synchronizing mechanisms 25a, 25b and 25c will be described with reference to FIG. 3. The illustrated synchronizing mechanisms 25a, 25b and 25c are all constituted substantially in the same manner. Therefore, described below is the only synchronizing mechanism 25a that is disposed between the fifth speed gear 241 and the fourth speed gear 242.

The illustrated synchronizing mechanism 25a is a known key-type synchronizing mechanism which comprises a clutch hub 251 mounted on the output shaft 22, a clutch sleeve 252 slidably fitted to an external gear spline formed on the outer circumference of the clutch hub 251, keys 253 arranged in plural (e.g., three) key grooves 251a formed in the clutch hub 251 in the radial direction thereof, key springs 254, 254 arranged on the inner sides at both ends of the keys 253 to push the keys 253 toward the clutch sleeve 252, dog teeth 241a and 242a formed on the fifth speed gear 241 and on the fourth speed gear 242, and synchronizer rings 255 and 256 disposed on the conical surfaces 241b and 242b formed on the fifth speed gear 241 and on the fourth speed gear 242. A shift fork 67 (that will be described later) is fitted into an annular groove 252a formed in the outer circumference of the clutch sleeve 252 of the thus constituted synchronizing mechanism 25a. The clutch sleeve 252 is slid by the shift fork 67 toward either the right direction or the left direction in the drawing, whereby the spline 252b of the clutch sleeve 252 is brought into mesh with teeth 255a of the synchronizer ring 255 and dog teeth 241a or with teeth 256a of the synchronizer ring 256 and dog teeth 242a. The illustrated synchronizing mechanism is constituted in a known manner and hence, is not described in further detail.

The above-mentioned synchronizing mechanisms 25a, 25b and 25c are operated by the speed-change lever 3 and by the shifting mechanism 6 connected to the speed-change lever 3. The speed-change lever 3 is so constituted that it can be tilted in a direction (i.e., selection direction) perpendicular to the surface of the paper in FIG. 1 and in the right-and-left direction (i.e., shift direction), on a shaft that is not shown as a center. In order to operate the synchronizing mechanisms 25a, 25b and 25c, the speed-change lever 3 is operated along speed-change patterns shown in FIG. 4. A shift knob switch 4 is provided in a knob 31 of the speed-change lever 3. The shift knob switch 4 has a first switch 41 (SW1) and a second switch 42 (SW2) for detecting the direction of operation when the knob 31 of the speed-change lever 3 is tilted to the direction of shift. The shift knob switch 4 is, for example, so constituted that the first switch 41 (SW1) is turned on when the knob 31 of the speed-change lever 3 is tilted toward the left in FIG. 1 and that the second switch 42 (SW2) is turned on when the speed-change lever 3 is tilted toward the right in FIG. 1. The shift knob switch 4 is further so constituted that when the driver takes his (her) hand off the knob 31 of the speed-change lever 3, both the first switch 41 (SW1) and the second switch 42 (SW2) are turned off, and the on and off signals are sent to a controller that will be described later. The above shift knob switch pertains to a known technology as disclosed in, for example, Japanese Laid-open Utility Model Publication (Kokai) No. 97133/1981 and hence, is not described in further detail.

Figure 5:
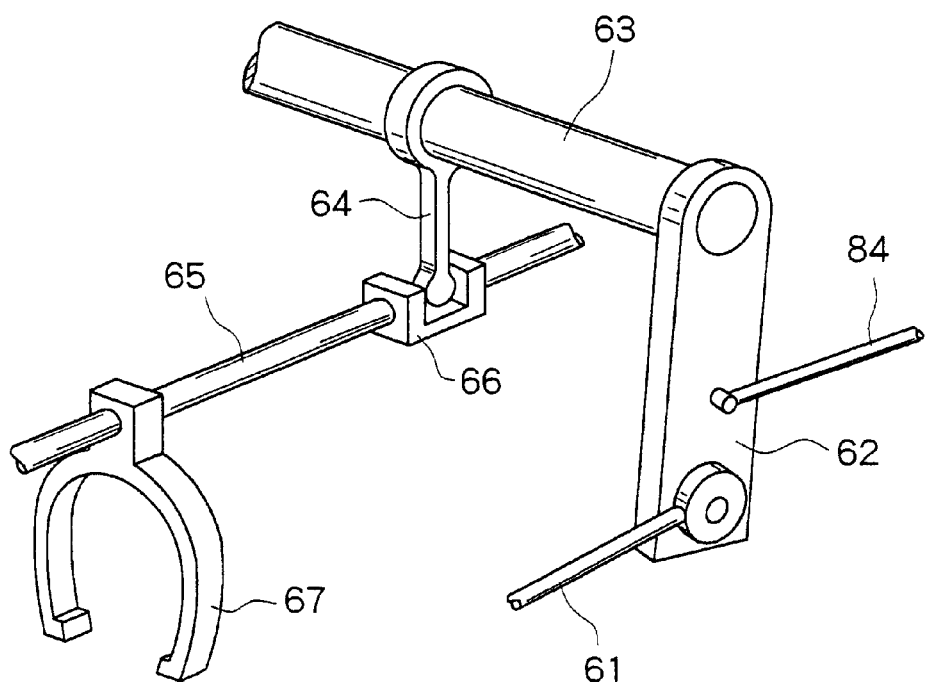
FIG. 5 is a perspective view illustrating a major portion of a shifting mechanism constituting the speed-changing mechanism shown in FIG. 1.

Next, described below with reference to FIGS. 1 and 5 is the shifting mechanism 6 that is coupled to the speed-change lever 3 and operates the synchronizing mechanisms 25a, 25b and 25c.

The shifting mechanism 6 comprises a push-pull cable 61 that is connected at its one end to the speed-change lever 3, a control lever 62 that is connected at its one end to the other end of the push-pull cable 61, a control rod 63 that is connected to the other end of the control lever 62, and a shift lever 64 mounted to the control rod 63. The shift lever 64 selectively engages at its end with a shift block 66 mounted to a shift rod 65. A shift fork 67 is mounted to the shift rod 65, and an end of the shift fork 67 engages with the annular groove 252a formed in the outer circumference of the clutch sleeve 252 of the synchronizing mechanism 25a. Though in FIG. 5, only the shift rod 65 for changing the speed between the fifth speed and the fourth speed is shown as a shift rod, the shifting mechanism is equipped with two other shift rods for operating the synchronizing mechanisms 25b and 25c. The shifting mechanism 6 is constituted in a known manner and hence, is not described here in detail.

In the illustrated embodiment, there is provided the shift-assisting device 8 for operating the above-mentioned shifting mechanism 6 in the same direction as the direction in which the speed-change lever 3 is shifted. The shift-assisting device 8 is equipped with an electric motor 81 (M1) which is a source of driving power capable of rotating forward and reversely. A reduction gear 82 is coupled to the electric motor 81 (M1), and an end of the operation lever 83 is fitted to an output shaft 821 of the reduction gear 82. The control lever 62 is coupled, via a coupling rod 84, to the other end of the operation lever 83. When the electric motor 81 (M1) is rotated forward, the thus constituted shift-assisting device 8 actuates the operation lever 83 in a direction indicated by an arrow 83a, and turns the control lever 62 in a direction indicated by an arrow 62a via the coupling rod 84 to assist the shifting operation. When the electric motor 81 (M1) is driven in reverse, on the other hand, the shift-assisting device 8 actuates the operation lever 83 in a direction indicated by an arrow 83b and turns the control lever 62 in a direction indicated by an arrow 62b via the coupling rod 84 to assist the shifting operation.

The shift-assisting device 8 in the illustrated embodiment has a shift stroke sensor 85 (SS) for detecting the shift stroke positions of the shifting mechanism. The shift stroke sensor 85 is coupled to the control lever 62 via a rod 86 and a lever 87, and comprises a potentiometer that detects the shift stroke positions depending upon the angle of operation of the control lever 62, and sends the detected signal to a controller 10.

The controller 10 is constituted by a microcomputer which comprises a central processing unit (CPU) 101 for executing the operation according to a control program, a read-only memory (ROM) 102 for storing the control program and a map for controlling the speed of connecting the clutch, that will be described later, a random access memory (RAM) 103 for storing the results of operation, a timer (T) 104, an input interface 105 and an output interface 106. The input interface 105 of the thus constituted controller 10 receives signals detected by the first switch 41 (SW1) and the second switch 42 (SW2) constituting the shift knob switch 4 and a signal detected by the shift stroke sensor 85 (SS). The input interface 105 further receives a signal detected by a clutch pedal switch 91 (SW3) which detects the state of operation of a clutch pedal 9 for operating a clutch disposed between the engine that is not shown and the transmission 2. The clutch pedal switch 91 (SW3) is turned off in a state where the clutch pedal 9 is released, i.e., where the clutch pedal 9 is not depressed (clutch is connected), and produces a signal ON when the clutch pedal 9 is depressed to disconnect the clutch. When an automatic clutch is mounted to automatically disconnect or connect the clutch based on the signals from the shift knob switch 4 and the shift stroke sensor 85 (SS), the input interface 105 receives a signal detected by a clutch stroke sensor that detects the amount of engagement of the clutch instead of the clutch pedal 9. The output interface 106 outputs control signals to the electric motor 81 (M1) and the like.

Figure 6:
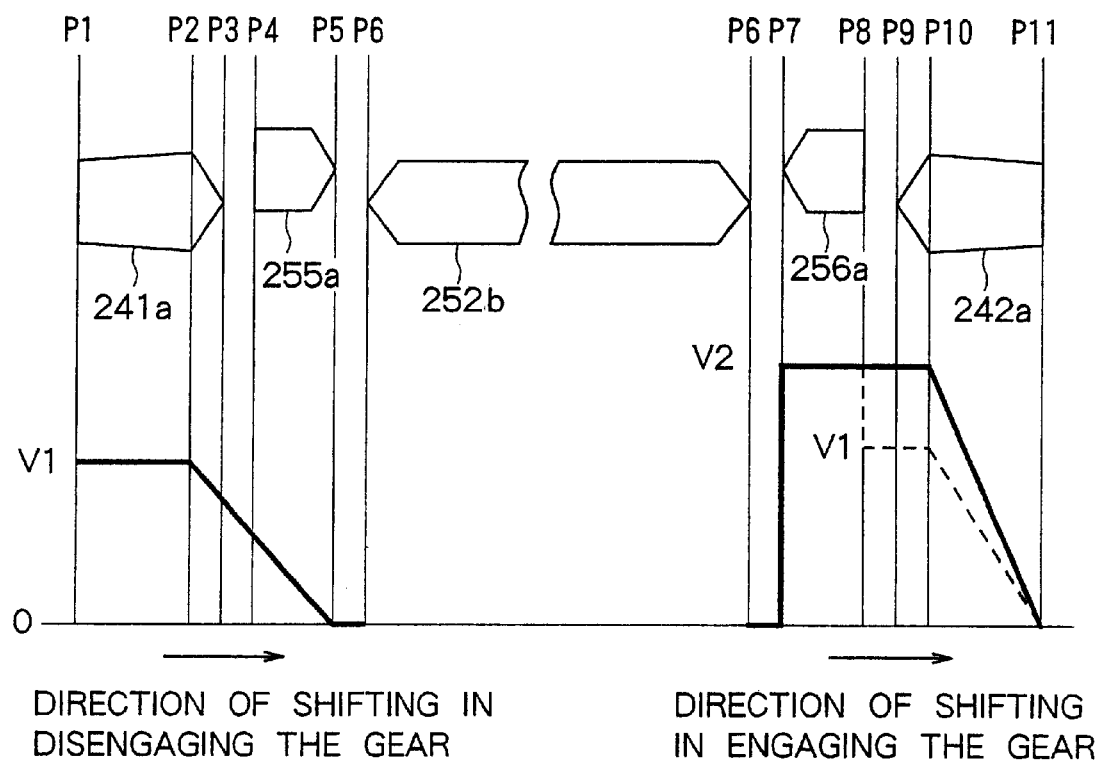
FIG. 6 is a diagram illustrating the relationship between the shift stroke positions of a clutch sleeve in the synchronizing mechanism shown in FIG. 3 and the voltages applied to the electric motor in the shift-assisting device.

Next, the assisting force corresponding to the shift stroke position will be described with reference to FIG. 6. FIG. 6 illustrates a positional relationship among the spline 252*b* of the clutch sleeve 252, the teeth 255*a* of the synchronizer ring 255 for the fifth speed gear 241 and dog teeth 241*a*, the teeth 256*a* of the synchronizer ring 256 for the fourth speed gear 242 and dog teeth 242*a*, in their neutral state. In the embodiment shown in FIG. 6, the shift stroke position of the clutch sleeve 252 in its neutral state is designated at P6. P5 denotes the shift stroke position of the clutch sleeve 252 that is moved from the neutral state toward the fifth speed gear 241 side (toward the left in FIG. 6) and arrives at the front end of the chamfer of the teeth 255*a* of the synchronizer ring 255 for the fifth speed gear 241, P4 denotes the shift stroke position of the clutch sleeve 252 that arrives at a rear end of the teeth 255*a* of the synchronizer ring 255, P3 denotes the shift stroke position of the clutch sleeve 252 that arrives at the front end of the chamfer of the dog teeth 241*a* for the fifth speed gear 241, P2 denotes the shift stroke position of the clutch sleeve 252 that arrives at the rear end of the chamfer of the dog teeth 241*a*, and P1 denotes the shift stroke position of the clutch sleeve 252 that arrives at at the rear end of the dog teeth 241*a*. On the other hand, P7 denotes the shift stroke position of the clutch sleeve 252 that is moved from the neutral state toward the fourth speed gear 242 side (toward the right in FIG. 6) and arrives at the front end of the chamfer of the teeth 256*a* of the synchronizer ring 256 for the fourth speed gear 242, P8 denotes the shift stroke position of the clutch sleeve 252 that arrives at the rear end of the teeth 256*a* of the synchronizer ring 256, P9 denotes the shift stroke position of the clutch sleeve 252 that arrives at the front end of the chamfer of the dog teeth 242*a* for the fourth speed gear 242, P10 denotes the shift stroke position of the clutch sleeve 252 that arrives at the rear end of the chamfer of the dog teeth 242*a*, and P11 denotes the shift stroke position of the clutch sleeve 252 that arrives at the rear end of the dog teeth 242*a*. The shift stroke positions are detected by the shift stroke sensor 85 (SS). In the illustrated embodiment, the shift stroke sensor 85 (SS) is so constituted as to produce a voltage signal of the smallest value when the shift stroke position is P1, to produce an output voltage that gradually increases as the shift stroke position goes to the P11 side and to produce a voltage signal of the greatest value when the shift stroke position is P11.

In shifting the clutch sleeve 252 from the neutral state shown in FIG. 6 toward either the fourth speed gear 242 side or the fifth speed gear 241 side (in engaging the gears), the greatest operation force acts on the speed-change lever 3 in the synchronizing range of from the shift stroke positions P7 or P5, i.e., from the positions at which the synchronizing action starts, up to the shift stroke position P8 or P4 at which the synchronizing action ends. During the gear-engaging operation, therefore, the electric motor 81 (M1) may be driven in at least the synchronizing range to assist the shifting operation. During the gear-engaging operation, further, a relatively large force, which is smaller than that of in the above-mentioned synchronizing range, acts on the speed-change lever 3 in the engaging range of from the shift stroke position P9 or P3 to the shift stroke position P10 or P2, i.e., in the range where the chamfer of the spline 252*b* of the clutch sleeve 252 engages with the chamfer of the dog teeth 242*a* or 241*a*. During the gear-engaging operation, therefore, it is desired to assist the shifting operation by driving the electric motor 81 (M1) even during the period in which the dog teeth engage with the chamfer of the clutch sleeve. Further, when the clutch sleeve 252 returns to the neutral state from a state of being engaged with the fourth speed gear 242 or the fifth speed gear 241, i.e., from the shift stroke position P11 or P1, a relatively large force acts on the speed-change lever 3 during the period until the spline 252*b* of the clutch sleeve 252 passes through the shift stroke position P10 or P2, i.e., passes through the rear end of the chamfer of the dog teeth. At the time of gear-disengaging operation, therefore, the shifting operation may be assisted by driving the electric motor 81 (M1) during the shift stroke of from the gear-engaged state until the rear end of the chamfer of the dog teeth is passed (i.e., in the range at which the dog teeth are in mesh with the clutch sleeve 52).

The assisting force during the gear-disengaging operation may be smaller than the assisting force during the gear-engaging operation. The assisting force is controlled by controlling the voltage or the current applied to the electric motor 81 (M1). The rotation of the electric motor 81 (M1) is, for example, forward rotation when the clutch sleeve 252 is operated toward the left in FIG. 6 (when the first switch 41 (SW1) of the shift knob switch 4 is turned on) and is, for example, reverse rotation when the clutch sleeve 252 is operated toward the right in FIG. 6 (when the second switch 42 (SW2) of the shift knob switch 4 is turned on). When, for example, the state where the gear is engaged with the fifth speed gear 241 is to be shifted down to the fourth speed, the electric motor 81 (M1) is reversely driven with a voltage V1 during from P1 to P2, i.e., until the spline 252*b* of the clutch sleeve 252 passes the rear end of the chamfer of the dog teeth 241*a* (during the period in which the dog teeth are in mesh with the clutch sleeve 252) as shown in FIG. 6. Then, the voltage is gradually lowered during the periods from P2 to P5 to stop the driving of the electric motor 81 (M1). And, when the clutch sleeve 252 arrives at P7 at which the synchronizing action starts from the neutral position P6, the electric motor 81 (M1) is reversely driven with a voltage V2 that is higher than the above voltage V1. In the embodiment shown in FIG. 6, the reverse rotation is maintained with the voltage V2 for a period until the spline 252b of the clutch sleeve 252 passes P10 that corresponds to the rear end of the chamfer of the dog teeth 242a. After the clutch sleeve 252 has passed P10, the voltage applied to the electric motor 81 (M1) is gradually lowered to halt the driving of the electric motor 81 (M1) at the shift stroke position P11. During the gear-engaging operation in the embodiment shown in FIG. 6, the voltage applied to the electric motor 81 (M1) may be lowered from V2 to V1 as indicated by a broken line after the synchronizing period of P8 has elapsed and the electric motor 81 (M1) may be driven with a voltage V1 until reaching P10. In the shift-assisting device of the illustrated embodiment as described above, the assisting force is controlled according to the shift stroke positions. Therefore, no time lag occurs in driving the electric motor, and the force for operating the speed-change lever can be made level over the whole stroke in the shifting operation.

Figure 7:
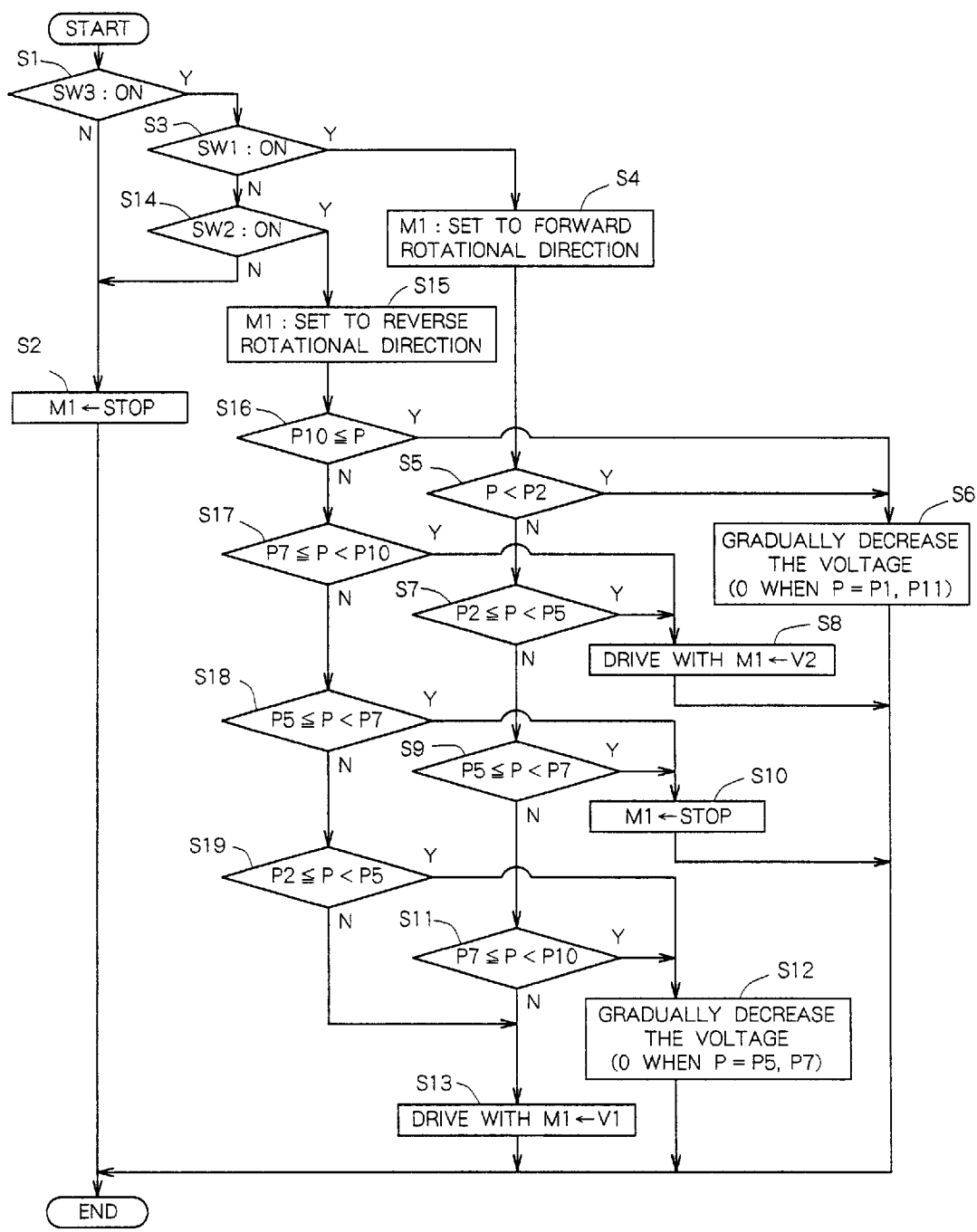
FIG. 7 is a flowchart showing a procedure of the shift-assisting control operation of a controller that constitutes the shift-assisting device in a transmission constituted according to the present invention.

Next, the operation of the controller 10 for assisting the shifting operation in the speed-change operation will be described with reference to the flow chart shown in FIG. 7.

First, the controller 10 checks whether the clutch pedal switch 91 (SW3) has been turned on, i.e., whether the clutch pedal 9 has been depressed to disconnect the clutch (step S1). When an automatic clutch is mounted, it is checked whether the stroke of engagement of the clutch is on the disconnection position side rather than a range of the partly-connected state of the clutch based on a signal from the clutch stroke sensor that detects the stroke of engagement of the clutch. When the clutch pedal switch 91 (SW3) has not been turned on at step S1, the controller 10 judges that the driver is not willing to change the speed since the clutch has not been disconnected, and the routine proceeds to step S2 to end the operation by bringing a halt to driving the electric motor 81 (M1).

Figure 4:
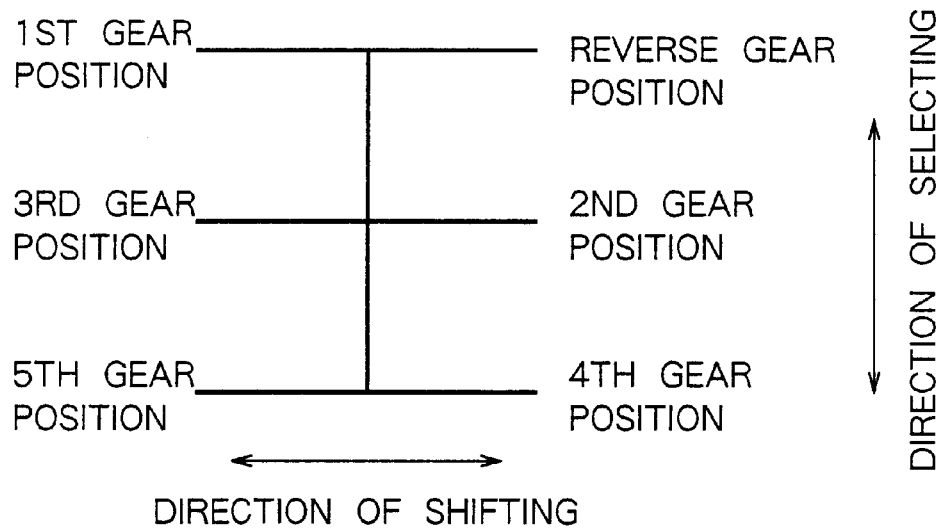
FIG. 4 is a diagram illustrating shifting patterns of a speed-change lever of the speed-changing mechanism shown in FIG. 1.

When the clutch pedal switch 91 (SW3) has been turned on at step S1, the controller 10 judges that the clutch has been disconnected and the driver is willing to change the speed, and the routine proceeds to step S3 where it is checked whether the first switch 41 (SW1) of the shift knob switch 4 is turned on, i.e., whether the operation has started to change the speed toward the first gear position, third gear position or fifth gear position (see FIG. 4). When the first switch 41 (SW1) has been turned on at step S3, the controller 10 proceeds to step S4 to set the electric motor 81 (M1) to turn forward and, then, proceeds to step S5 where it is checked whether the shift stroke position P detected by the shift stroke sensor 85 (SS) is smaller than P2, i.e., whether the clutch sleeve 252 is on the gear-engaging side rather than the rear end of the chamfer of the dog teeth 241a. When the shift stroke position P is smaller than P2 at step S5, the controller 10 judges that the clutch sleeve 252 is on the gear-engaging side rather than the rear end of the chamfer of the dog teeth 241a and there is no need of assisting the shift. The routine then proceeds to step S6 where the voltage applied to the electric motor 81 (M1) is gradually decreased, and the voltage is nullified (0) after the shift stroke position P has reached P1.

When the shift stroke position P is larger than P2 at step S5, the controller 10 proceeds to step S7 and checks whether the shift stroke position P is larger than P2 but is smaller than P5, i.e., whether the clutch sleeve 252 is in a range of from a position of starting the synchronization up to a position where the dog teeth engage with the chamfer. When the shift stroke position P is larger than P2 but is smaller than P5 at step S7, the controller 10 judges that the clutch sleeve 252 is in the range of from the position of starting the synchronization to the position where the dog teeth are engaged with the chamfer, and that the shifting must be assisted during the gear-engaging operation. The routine therefore proceeds to step S8 where the electric motor 81 (M1) is driven with the voltage V2.

When the shift stroke position P is larger than P2 but is not smaller than P5 at step S7, the controller 10 proceeds to step S9 and checks whether the shift stroke position P is larger than P5 but is smaller than P7, i.e., whether the clutch sleeve 252 is positioned between the two synchronizer rings 255 and 256. When the shift stroke position P is larger than P5 and is smaller than P7 at step S9, the controller 10 judges that the clutch sleeve 252 is positioned between the two synchronizer rings 255 and 256 and that there is no need to assist the shifting operation. The routine, then, proceeds to step S10 where the electric motor 81 (M1) is brought to a halt.

When the shift stroke position P is larger than P5 but is not smaller than P7 at step S9, the controller 10 proceeds to step S11 and checks whether the shift stroke position P is larger than P7 but is smaller than P10, i.e., whether the clutch sleeve 252 is out of mesh with the dog teeth 242a and the gear-disengaging operation is completed. When the shift stroke position P is larger than P7 but is smaller than P10 at step 11, the controller 10 judges that the clutch sleeve 252 is out of mesh with the dog teeth 242a and the gear-disengaging operation has been completed. The routine, then, proceeds to step S12 where the voltage applied to the electric motor 81 (M1) is gradually decreased, and the voltage is nullified (0) after the shift stroke position P has reached P7.

When the shift stroke position P is larger than P7 but is not smaller than P10 at step S11, the controller 10 judges that the clutch sleeve 252 is in mesh with the dog teeth 242a and that the shifting operation must be assisted during the gear-disengaging operation. The electric motor 81 (M1), therefore, is driven with the voltage V1.

Next, described below is a case where the first switch 41 (SW1) of the shift knob switch 4 has not been turned on at step S3.

When the first switch 41 (SW1) of the shift knob switch 4 has not been turned on at step S3, the controller proceeds to step S14 and checks whether the second switch 42 (SW2) is turned on, i.e., whether the operation has started to change the speed toward the second gear position, fourth gear position or reverse gear position (see FIG. 4). When the second switch 42 (SW2) has not been turned on at step S14, the controller 10 judges that the driver is not willing to change the speed, and the routine proceeds to step S2 to end the operation by bringing the electric motor 81 (M1) to a halt.

When the second switch 42 (SW2) has been turned on at step S14, the controller 10 proceeds to step S15 to set the electric motor 81 (M1) to rotate in the reverse direction, and further proceeds to step S16 and checks whether the shift stroke position P detected by the shift stroke sensor 85 (SS) is larger than P10, i.e., whether the clutch sleeve 252 is on the gear-engaging side rather than the rear end of the chamfer of the dog teeth 242a. When the shift stroke position P is larger than P10 at step S16, the controller 10 judges that the clutch sleeve 252 is on the gear-engaging side rather than the rear end of the chamfer of the dog teeth 242a and that there is no need to assist the shifting. The routine then proceeds to step S6 where the voltage applied to the electric motor 81 (M1) is gradually decreased, and the voltage is nullified (0) after the shift stroke position P has reached P11.

When the shift stroke position P is smaller than P10 at step S16, the controller 10 proceeds to step S17 and checks whether the shift stroke position P is larger than P7 but is smaller than P10, i.e., whether the clutch sleeve 252 is in the range of from a position for starting the synchronization to a position where the dog teeth engage with the chamfer. When the shift stroke position P is larger than P7 but is smaller than P10 at step S17, the controller 10 judges that the clutch sleeve 252 is in the range of from the position for starting the synchronization to the position where the dog teeth engage with the chamfer and that the shifting must be assisted during the gear-engaging operation. The routine, then, proceeds to step S8 where the electric motor 81 (M1) is driven with the voltage V2.

When the shift stroke position P is not larger than P7 and is smaller than P10 at step S17, the controller 10 proceeds to step S18 and checks whether the shift stroke position P is larger than P5 but is smaller than P7, i.e., whether the clutch sleeve 252 is positioned between the two synchronizer rings 255 and 256. When the shift stroke position P is larger than P5 but is smaller than P7 at step S18, the controller 10 judges that the clutch sleeve 252 is positioned between the two synchronizer rings 255 and 256 and that there is no need to assist the shifting operation. The routine, then, proceeds to step S10 where the electric motor 81 (M1) is brought to a halt.

When the shift stroke position P is not larger than P5 and is smaller than P7 at step S18, the controller 10 proceeds to step S19 and checks whether the shift stroke position P is larger than P2 but is smaller than P5, i.e., whether the clutch sleeve 252 is out of mesh with the dog teeth 241a and the gear-disengaging operation is completed. When the shift stroke position P is larger than P2 but is smaller than P5 at step 19, the controller 10 judges that the clutch sleeve 252 is out of mesh with the dog teeth 241a and the gear-disengaging operation is completed. The routine, then, proceeds to step S12 where the voltage applied to the electric motor 81 (M1) is gradually decreased, and the voltage is nullified (0) after the shift stroke position P has reached P5.

When the shift stroke position P is not larger than P2 and is smaller than P5 at step S19, the controller 10 judges that the clutch sleeve 252 is in mesh with the dog teeth 241a and that the shifting must be assisted during the gear-disengaging operation. Therefore, the electric motor 81 (M1) is driven with the voltage V1.

The shift-assisting device for a transmission according to the present invention is constituted as described above, and exhibits actions and effects as described below.

According to the present invention, the shift-assisting device for a transmission comprises an electric motor for operating a shifting mechanism in the same direction as the direction in which a speed-change lever is shifted, said shifting mechanism being coupled to said speed-change lever to actuate a synchronizing mechanism of the transmission, wherein said shift-assisting device for a transmission comprises a shift stroke sensor for detecting a shift stroke position of said shifting mechanism, and a control means for outputting a control signal corresponding to the shift stroke position to said electric motor based on a signal detected by said shift stroke sensor. Therefore, since the assisting force is controlled according to the shift stroke position, without producing a time lag at the time of driving the electric motor, the force for operating the speed-change lever can be leveled over the whole stroke of the shifting operation.

I claim:

1. A shift-assisting device for a transmission having an electric motor for operating a shifting mechanism in the same direction as the direction in which a speed-change lever is shifted, said shifting mechanism being coupled to said speed-change lever to actuate a synchronizing mechanism of the transmission, said shift-assisting device for a transmission comprising:
    a shift stroke sensor for detecting a shift stroke position of said shifting mechanism; and
    a controller for outputting a control signal corresponding to the shift stroke position to said electric motor based on a signal detected by said shift stroke sensor, wherein:
        said controller outputs a drive signal to the electric motor over at least a synchronizing range in the shift stroke range of the shifting mechanism at the gear-engaging operation in the shifting operation, and outputs a drive signal to the electric motor over at least a range in which a clutch sleeve of the synchronizing mechanism is in mesh with dog teeth of a gear of the transmission at the gear-disengaging operation in the shifting operation; and
        said controller sets a driving force of the electric motor in the range in which the clutch sleeve is in mesh with the dog teeth at the gear-disengaging operation to be smaller than a driving force of the electric motor in the synchronizing range at the gear-engaging operation.

2. A shift-assisting device for a transmission having an electric motor for operating a shifting mechanism in the same direction as the direction in which a speed-change lever is shifted, said shifting mechanism being coupled to said speed-change lever to actuate a synchronizing mechanism of the transmission, said shift-assisting device for a transmission comprising:
    a shift stroke sensor for detecting a shift stroke position of said shifting mechanism; and
    a controller for outputting a control signal corresponding to the shift stroke position to said electric motor based on a signal detected by said shift stroke sensor, wherein:
        said controller outputs a drive signal to the electric motor over at least a synchronizing range in the shift stroke range of the shifting mechanism at the gear-engaging operation in the shifting operation, and outputs a drive signal to the electric motor over at least a range in which a clutch sleeve of the synchronizing mechanism is in mesh With dog teeth of a gear of the transmission at the gear-disengaging operation in the shifting operation;
        said controller, at the gear-engaging operation, outputs a drive signal to the electric motor in at least the synchronizing range in the shift stroke range of the shifting mechanism and in the range in which a chamfer of the clutch sleeve of the synchronizing mechanism is in mesh with a chamfer of the dog teeth; and
        said controller sets a driving force of the electric motor in a range in which the chamfer of the clutch sleeve is in mesh with the chamfer of the dog teeth at the gear-engaging operation to be smaller than a driving force of the electric motor in the synchronizing range at the gear-engaging operation.

3. A shift-assisting device for a transmission having a synchronizing mechanism, said shift-assisting device comprising:

a speed-change lever adapted to be shifted to indicate a desired direction of shifting;

a shifting mechanism coupled to said speed-change lever for actuating the transmission synchronizing mechanism;

an electric motor for assisting operation of said shifting mechanism through a shift stroke range;

a shift stroke sensor for detecting the shift stroke position of said shifting mechanism; and a controller for providing to said electric motor an output signal corresponding to the detected shift stroke position, to cause said electric motor to operate said shifting mechanism through a shift stroke in the same direction as the direction of shift of said speed-change lever, wherein:

during a gear-engaging operation said controller outputs a first drive signal to said electric motor over a synchronizing range of the shift stroke range, to drive said electric motor with a first driving force; and during a gear-disengaging operation said controller outputs a second drive signal to said electric motor over a range in which a clutch sleeve of the synchronizing mechanism is in mesh with dog teeth of a gear of the transmission, to drive said electric motor with a second driving force smaller than the first driving force.

4. A shift-assisting device for a transmission having a synchronizing mechanism, said shift-assisting device comprising:

a speed-change lever adapted to be shifted to indicate a desired direction of shifting;

a shifting mechanism coupled to said speed-change lever for actuating the transmission synchronizing mechanism;

an electric motor for assisting operation of said shifting mechanism through a shift stroke range;

a shift stroke sensor for detecting the shift stroke position of said shifting mechanism; and a controller for providing to said electric motor an output signal corresponding to the detected shift stroke position, to cause said electric motor to operate said shifting mechanism through a shift stroke in the same direction as the direction of shift of said speed-change lever, wherein:

during a gear-engaging operation said controller outputs a first drive signal to said electric motor over a synchronizing range of the shift stroke range, to drive said electric motor with a first driving force, and outputs a second drive signal to said electric motor over a range in which a chamfer of a clutch sleeve of the synchronizing mechanism is in mesh with a chamfer of dog teeth of a gear of the transmission, to drive said electric motor with a second driving force smaller than the first driving force; and during a gear-disengaging operation said controller outputs a third drive signal to said electric motor over a range in which the clutch sleeve of the synchronizing mechanism is in mesh with dog teeth of a gear of the transmission, to drive said electric motor with a third driving force.

5. A shift-assisting device as claimed in claim 4, wherein the third driving force is substantially equal to the second driving force.

* * * * *